United States Patent
Lota et al.

(10) Patent No.: US 7,690,708 B2
(45) Date of Patent: Apr. 6, 2010

(54) FRONT TO REAR CONSOLE MIKIRI OVERLAP

(75) Inventors: Charan Singh Lota, Canton, MI (US); Atsushi Kobayashi, Nagoya (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 20 days.

(21) Appl. No.: 11/971,971

(22) Filed: Jan. 10, 2008

(65) Prior Publication Data
US 2009/0179448 A1  Jul. 16, 2009

(51) Int. Cl.
*B60R 7/04* (2006.01)
(52) U.S. Cl. .................. 296/24.34; 296/37.8
(58) Field of Classification Search .............. 296/37.8, 296/24.34, 70
See application file for complete search history.

(56) References Cited
U.S. PATENT DOCUMENTS

| | | | | |
|---|---|---|---|---|
| 4,690,448 A | * | 9/1987 | Fujisawa | 296/37.8 |
| 5,106,143 A | * | 4/1992 | Soeters | 296/37.8 |
| 6,231,098 B1 | | 5/2001 | Schenk et al. | |
| 7,011,273 B1 | | 3/2006 | Stanford | |
| 2007/0138819 A1 | | 6/2007 | Akimoto et al. | |
| 2007/0158966 A1 | | 7/2007 | Tomasson et al. | |

* cited by examiner

Primary Examiner—Joseph D Pape
(74) Attorney, Agent, or Firm—Gifford, Krass, Sprinkle, Anderson & Citkowski, P.C.

(57) ABSTRACT

A vehicle console center console assembly including a first portion secured to an instrument panel and incorporating a gear shifter and a second portion supported upon a vehicle floor and establishing a mating profile along each of first and second sides with the first portion. Upper located and angled mating shoulders established between the portions limit the effect of sagging of the first portion, via support provided from the second portion. The appearance of gaps in the mating profiles is further limited by overlapping the edges of the second portion to those of the first portion. The second portion further includes inwardly configured support tabs proximate its side edges and which establish channels therebetween for seating the trailing edges of the first portion and permitting a limited degree of non-evident misalignment between the portions.

7 Claims, 4 Drawing Sheets ated with upper end locations of the second console portion 26. Upon aligning and securing the pairs of clips as shown in

FRONT TO REAR CONSOLE MIKIRI OVERLAP

FIELD OF THE INVENTION

The present invention relates generally to a vehicle console center console assembly including a first portion secured to an instrument panel and incorporating a gear shifter and a second portion is supported upon a vehicle floor and establishing a mating profile along each of first and second sides with the first portion. Upper located and angled mating shoulders established between the portions limit the effect of sagging of the first portion, via support provided from the second portion. The appearance of gaps in the mating profiles is further limited by overlapping the edges of the second portion to those of the first portion. The second portion further includes inwardly configured support tabs proximate its side edges and which establish channels therebetween for seating the trailing edges of the first portion and permitting a limited degree of non-evident misalignment between the portions.

BACKGROUND OF THE INVENTION

Center console assemblies typically include a first or forward mounted console portion incorporating a gear shifter mechanism and which is secured, such as by brackets, to the vehicle instrument panel, in turn typically connected to such as a crosswise extending vehicle A-pillar. A rear console portion is in turn supported upon a vehicle floor, typically a ½ tunnel configuration extending in lengthwise fashion between front seats of the vehicle.

In use, the forward console portion tends to sag about its bracket connections to the instrument panel. Given the floor supporting nature of the rear console portion, the creation of gaps between aligning side edges of the forward and rear console portions is an often occurrence in response to pivoting deflection of the forward console relative to the fixed and upwardly force projecting rear console.

SUMMARY OF THE INVENTION

The present invention discloses a vehicle console center console assembly including a first portion secured to an A-pillar supported instrument panel and incorporating a gear shifter. A second console portion is supported upon a vehicle floor (½ tunnel) and establishes a mating profile along each of first and second sides with the first portion.

Upper located and angled mating shoulders are established between the consoles, secured by overlapping clips associated with the respective portions, and in order to limit the effect of sagging of the first portion via upward support provided from the second portion. The appearance of gaps in the side disposed mating profiles is further limited by overlapping the edges of the second (rearward) portion relative to those of the first (forward) portion. The second portion further includes forwardly and inwardly configured tabs extending proximate its side edges, and which establish channels therebetween for seating the trailing edges of the first portion and permitting a limited degree of non-evident misalignment between the portions.

BRIEF DESCRIPTION OF THE DRAWINGS

Reference will now be made to the attached drawings, when read in combination with the following detailed descriptions wherein like reference numerals refer to like parts throughout the several views, and in which.

DETAILED DESCRIPTION OF THE PREFERRED EMBODIMENTS

Figure 1:
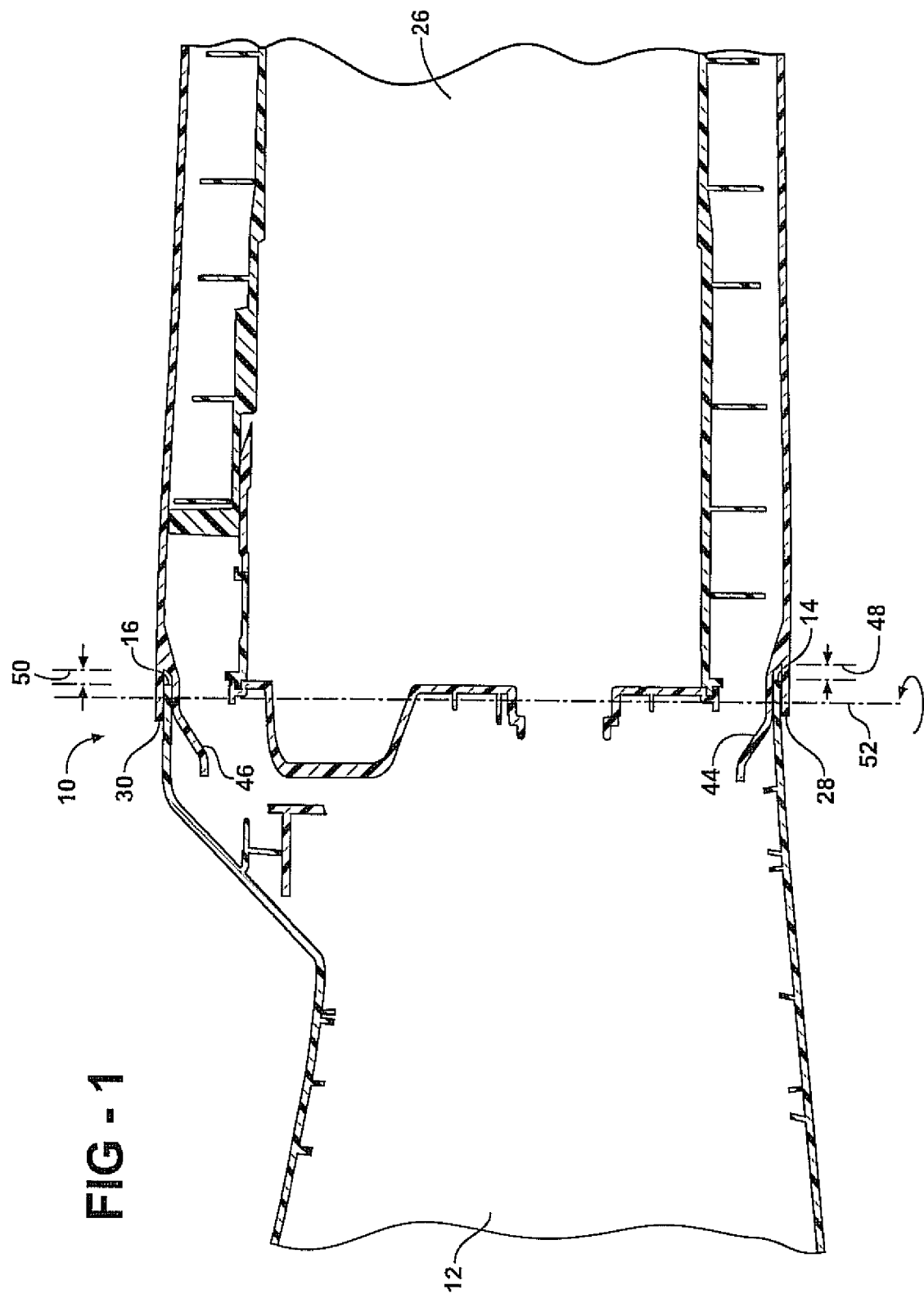
FIG. 1 is a top cutaway view of the center console assembly according to the present invention and illustrating the configuration of the inwardly spaced support tabs and outer side edges of the second console portion, for creating channels for receiving the first console inserting edges and in order to permit a limited degree of non-evident and gap-preventing misalignment between the portions.

Referring now to FIGS. 1-4, a series of cutaway, assembled and exploded illustrations are shown of a center console assembly 10 according to the present invention. A first and forward console portion 12 is constructed of a suitable material, typically polymeric, exhibiting a specified and three dimensional shape and which is secured, such as by brackets (see at 11 in FIG. 4) to a vehicle instrument panel, and such as is referenced in part at 13 in FIG. 2. Although also not shown, the instrument panel is in turn secured to a crosswise extending A-pillar associated with the vehicle.

The first console portion 12 further includes a specified interior configuration (see as shown in rotated perspective illustration of FIG. 3) and which can also incorporate such as a gear shifter (not shown). Additional features include first 14 and second 16 spaced apart and extending side edges, terminating at upper locations in a first pair of clips 18 and 20 (FIG. 3) extending in inwardly spaced proximity to angled surfaces 22 and 24.

Figure 4:
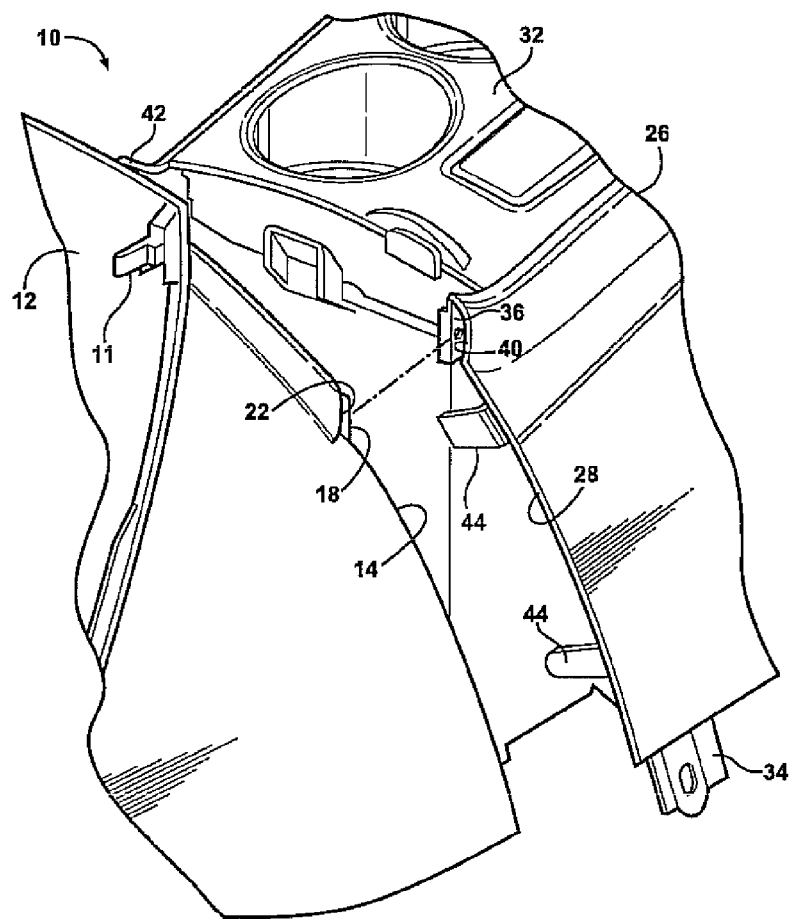
FIG. 4 is a rotated perspective of the exploded view of FIG. 3 and illustrating the inwardly configured clips associated with the mating edge of the second console portion, and which establishes the side channels for seating the edges of the first portion in the fashion evident in FIG. 1.

A second console portion 26 is provided and likewise constructed of a suitable polymeric or like material exhibiting a specified and three dimensional shape with associated side configured and mating edges 28 and 30. As further shown in the perspective of FIG. 4, the second console 26 is typically associated with a rearward extending portion and can support within its associated open interior such as a cup holder and storage tray 32. Also shown in FIG. 4 are downwardly extending mounting brackets (see at 34) for securing the second console portion 26 to the floor of the vehicle (not shown) and which can include such as a ½ tunnel arrangement extending between front seats. While a number of floor supporting configurations are possible in regards to the second console portion 26, the use of brackets 34 allows a degree of deflection/rotation of the second console portion, this assisting in preventing the occurrence of V-gaps between the console portions according to one objective of the present inventions.

Figure 2:
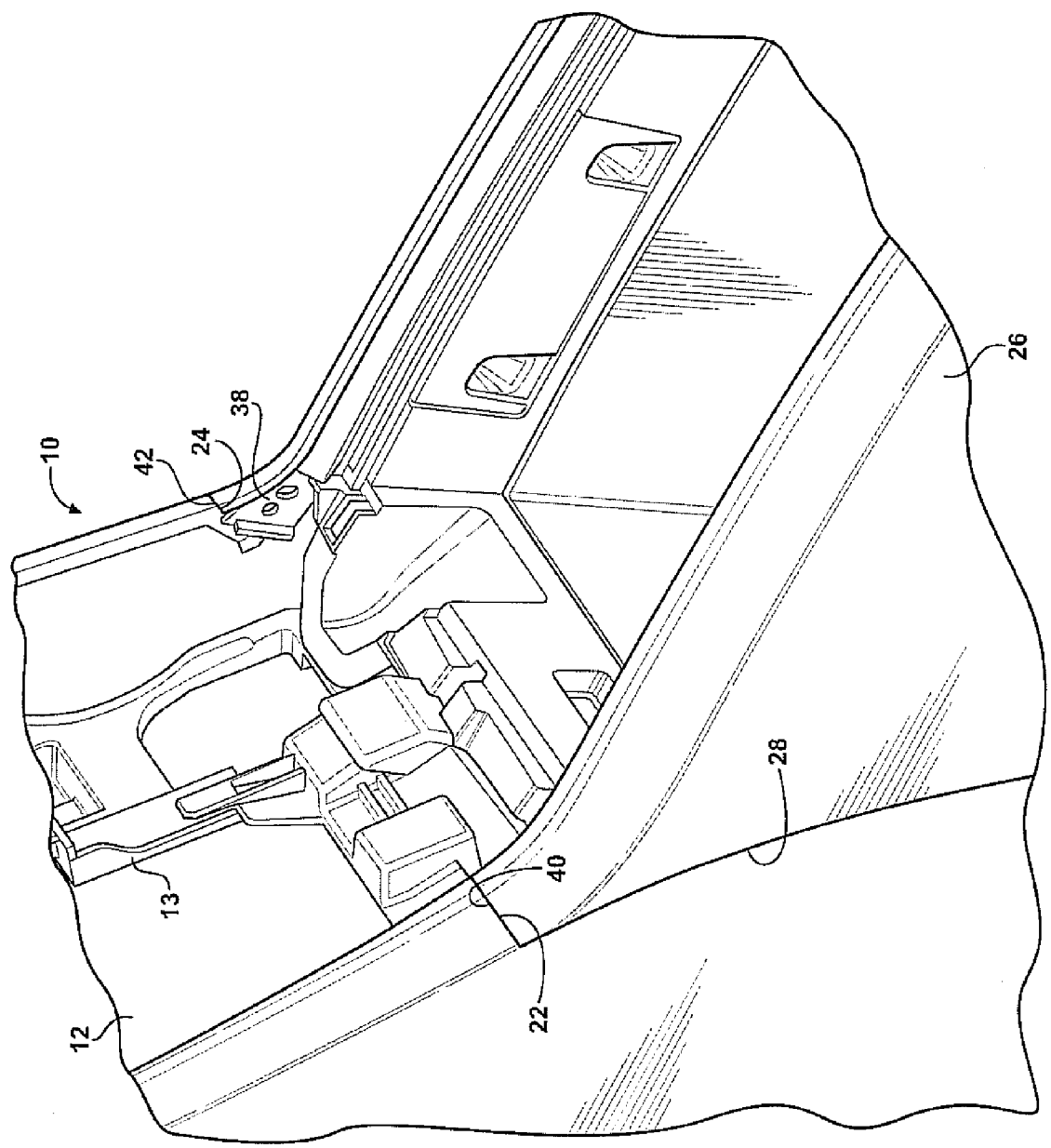
FIG. 2 is a perspective illustration of the first and second console portions in an assembled configuration and further showing the upper located and angled mating shoulders established between the portions for limiting the effect of sagging of the first portion, via support provided from the second portion.

The second console portion 26 further exhibits a second pair of clips 36 and 38 (see FIGS. 2-4) extending, from the second console in mating and overlapping fashion relative to the clips 18 and 20 associated with the first console portion 12. Additional angled support surfaces 40 and 42 are associated with upper end locations of the second console portion 26. Upon aligning and securing the pairs of clips as shown in FIG. 2, the support surfaces establish mating shoulders (22 & 40 and 24 & 42) between the first 12 and second 26 console portions, and such that the inevitable effects of sagging of the first (or front instrument panel mounted) console, such as resulting from the inherent bracket mounted arrangement, are opposed by the upwardly directed support provided by upper end located and angled surfaces 40 and 42 of the floor mounted second (rear) console 26. A feature of the inventions also includes the ability to limit an associated height of the mating locations established by each opposing pair of angled support surfaces.

As further is specifically illustrated by the top cutaway view of the center console assembly in FIG. 2, additional clip and channel engagement arrangements are established between both of the mating sides of the first 12 and second 26 console portions and which, as previously described, permit a limited degree of non-evident and gap-preventing misalignment to occur between the console portion along their mating sides, and in particular along a side extending gap zone along each of first and second sides of the mating console portions. In order to mask the appearance of gaps occurring as a result of inevitable misalignments between the first 12 and second 26 console portions, and along their side disposed mating profiles, the terminating side edges 14 and 16 of the first console 12 are outwardly overlapped by the edges 28 and 30 of the second console 26.

A seating channel and misalignment permitting arrangement is further established through the provision of forwardly and inwardly configured support tabs, see at 44 and 46 in FIGS. 1 and 4. The tabs 44 and 46 are typically integrally formed in recessed mounting fashion with the associated edges of the second console 26. The shaping of the support tabs 44 and 46, as best shown again in reference to FIG. 1, are such that they provide inwardly supporting and selectively deflecting surfaces and which, in combination with the spaced apart and outer edges 28 and 30, facilitate sandwiched engagement around both the inner and outer corners of the corresponding, first console edges 14 and 16. As is again shown in FIG. 1, the support tabs 44 and 46 each further exhibit an irregular shape projecting an interior distance past the first console edges 14 and 16, this assisting in providing deflecting support to maintain the integrity of the gap-masking and mating profile along each side edge of the assembled console portions.

Interior pockets 48 and 50 are also established between the inwardly configured tabs 44 and 46, relative to the outer edges 28 & 30, and upon insertion of the extending edges 14 and 16 of the first console 12, in FIG. 1. The pockets 48 and 50 establish a permitted degree of pivoting or rotating misalignment between the console portions 12 and 26, such as which can occur about an axial zone 52 and again resulting from an inherent (minor) remaining degree of sagging of the instrument panel mounted console 12 relative to the floor mounted and fixedly upright supported console portion 26.

Figure 3:
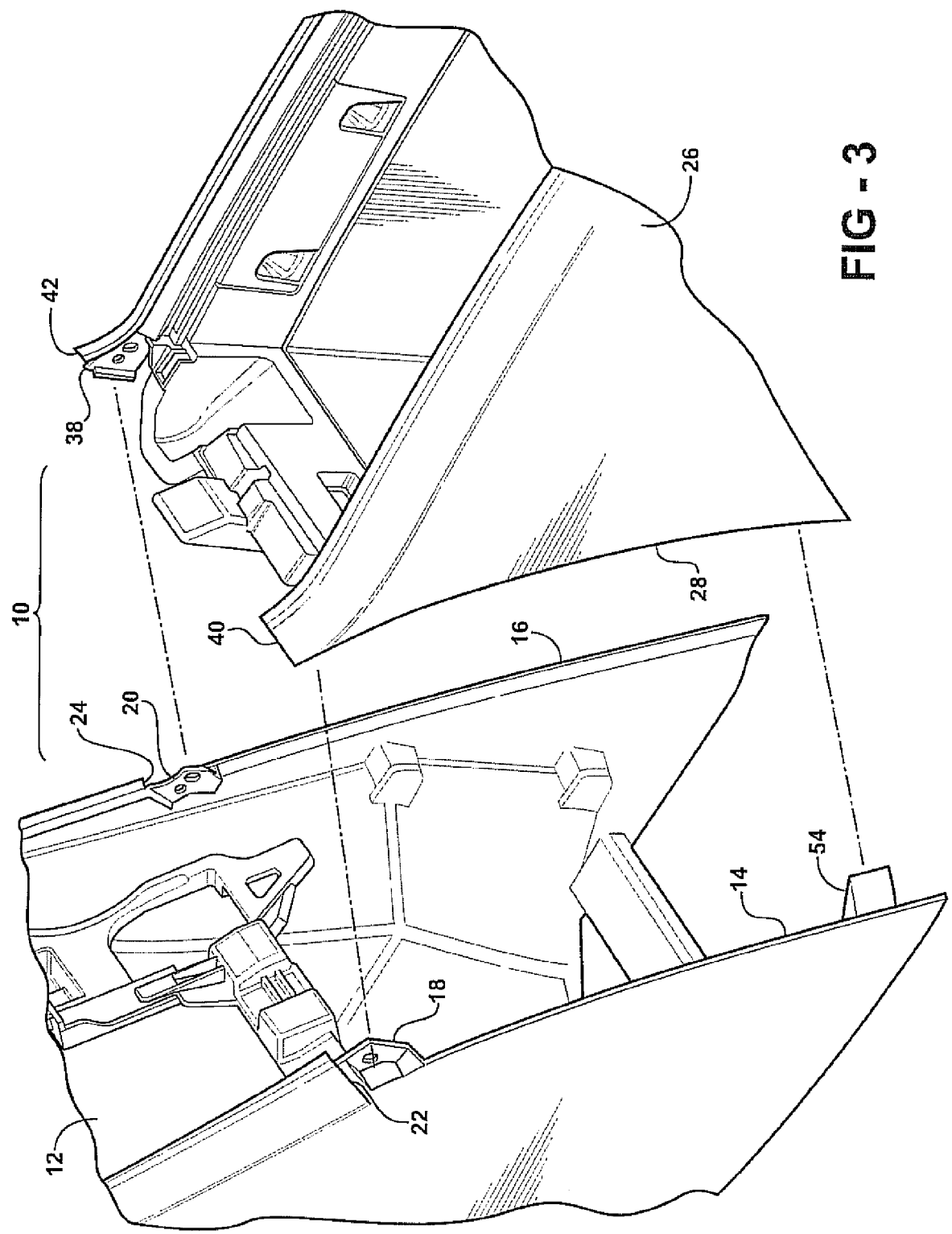
FIG. 3 is an exploded view of FIG. 2 and illustrating mounting clips established in overlapping and inter-engaging fashion proximate the mating shoulders.

As previously described, the angled and mating shoulder supporting feature established between the first 12 and second 26 consoles is intended to prevent a degree of otherwise sagging motion of the first console 12, with the sandwiched, overlapping and side disposed channel relationships shown in FIG. 1 contributing to mask the occurrence of any remaining degree of gapping (also known as V-gapping) between the console portions. Also shown in FIG. 3 are additional console locating and aligning projections, at 54 and associated with the first console portion 12, and which extend beyond the first edges 14 and 16 in a spaced and non-interfering fashion with the channel creating tabs 44 and 46 and second console outer edges 28 and 30.

Having described our invention, other and additional preferred embodiments will become apparent to those skilled in the art to which it pertains and without deviating from the scope of the appended claims.

We claim:

1. A vehicle center console assembly, comprising:
    a first console secured to an instrument panel and including spaced apart side edges;
    a second console supported upon a vehicle floor and including opposing side edges which, upon assembly with said first console, establish mating side profiles between said consoles;
    said mating profiles including said second console having support tabs projecting in a forward and inward direction relative to said side edges of said second console to define channels for seating therebetween said edges of said first console and to accommodate misalignment between said consoles; and
    shoulder supports established at upper locations of said mating profiles for limiting a degree of deflection of said first console relative to said second console.

2. The invention as described in claim 1, said first console having a specified shape and size and further comprising a first pair of clips extending in inwardly spaced proximity to first angled surfaces.

3. The invention as described in claim 2, said second console having a specified shape and size and further comprising a second pair of clips extending in mating and overlapping fashion relative to said first pair of clips associated with said first console portion.

4. The invention as described in claim 3, said shoulder supports further comprising additional angled support surfaces associated with upper end locations of the said second console portion and which align with and shoulder against said first angled surfaces of said first console portion.

5. The invention as described in claim 1, further comprising downwardly extending mounting brackets securing said second console portion to the floor of the vehicle in a selected deflection/rotation permitting fashion.

6. The invention as described in claim 1, said second console portion exhibiting a specified shape and size exhibiting an open interior within which is supported a cup holder and storage tray.

7. The invention as described in claim 1, further comprising locating projections associated with said first console portion and which are spaced in non-interfering fashion with said tabs and second console outwardly spaced edges.

\* \* \* \* \*